Jan. 10, 1933.  F. J. MULLINS  1,893,903
FISH HANDLING DEVICE
Filed Jan. 31, 1930  2 Sheets-Sheet 1
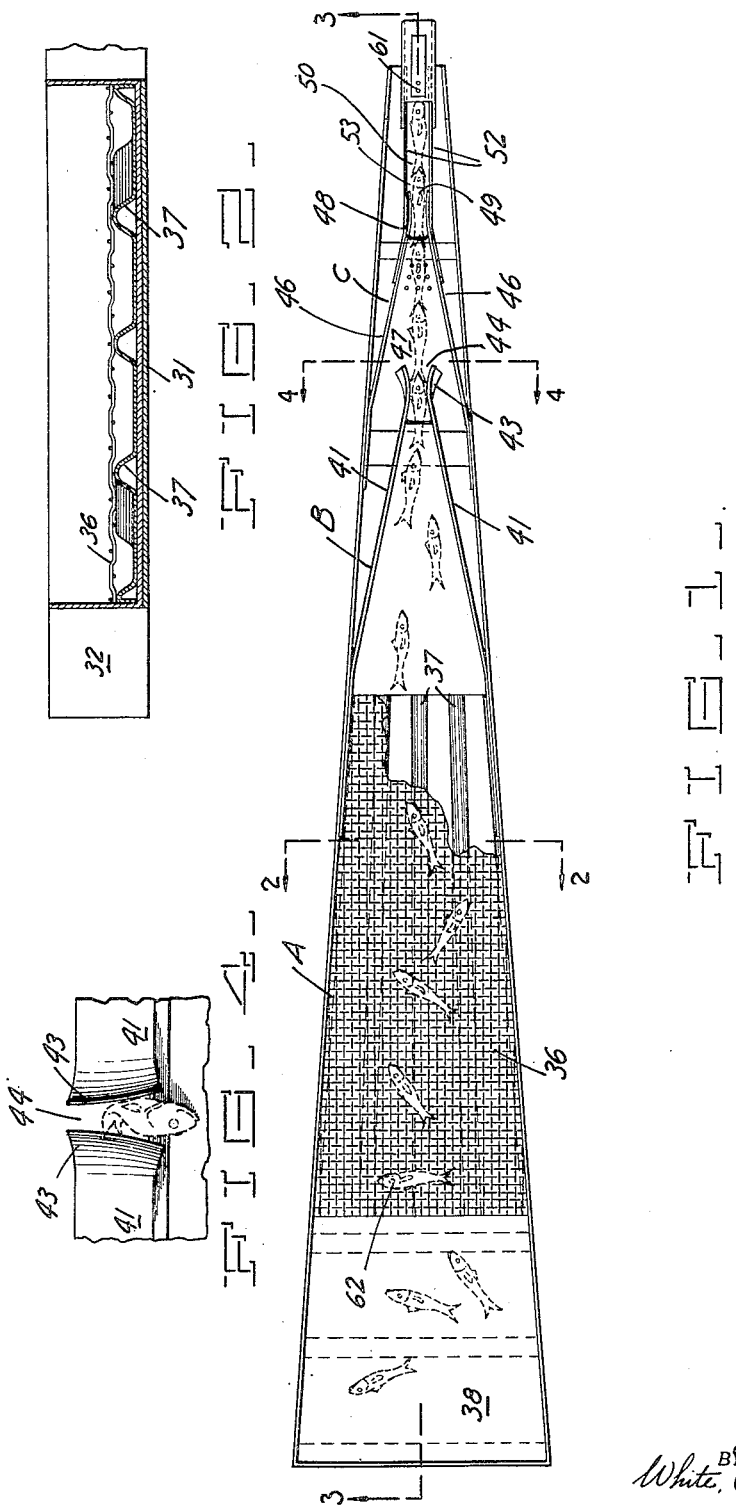

Jan. 10, 1933.  F. J. MULLINS  1,893,903
FISH HANDLING DEVICE
Filed Jan. 31, 1930  2 Sheets-Sheet 2
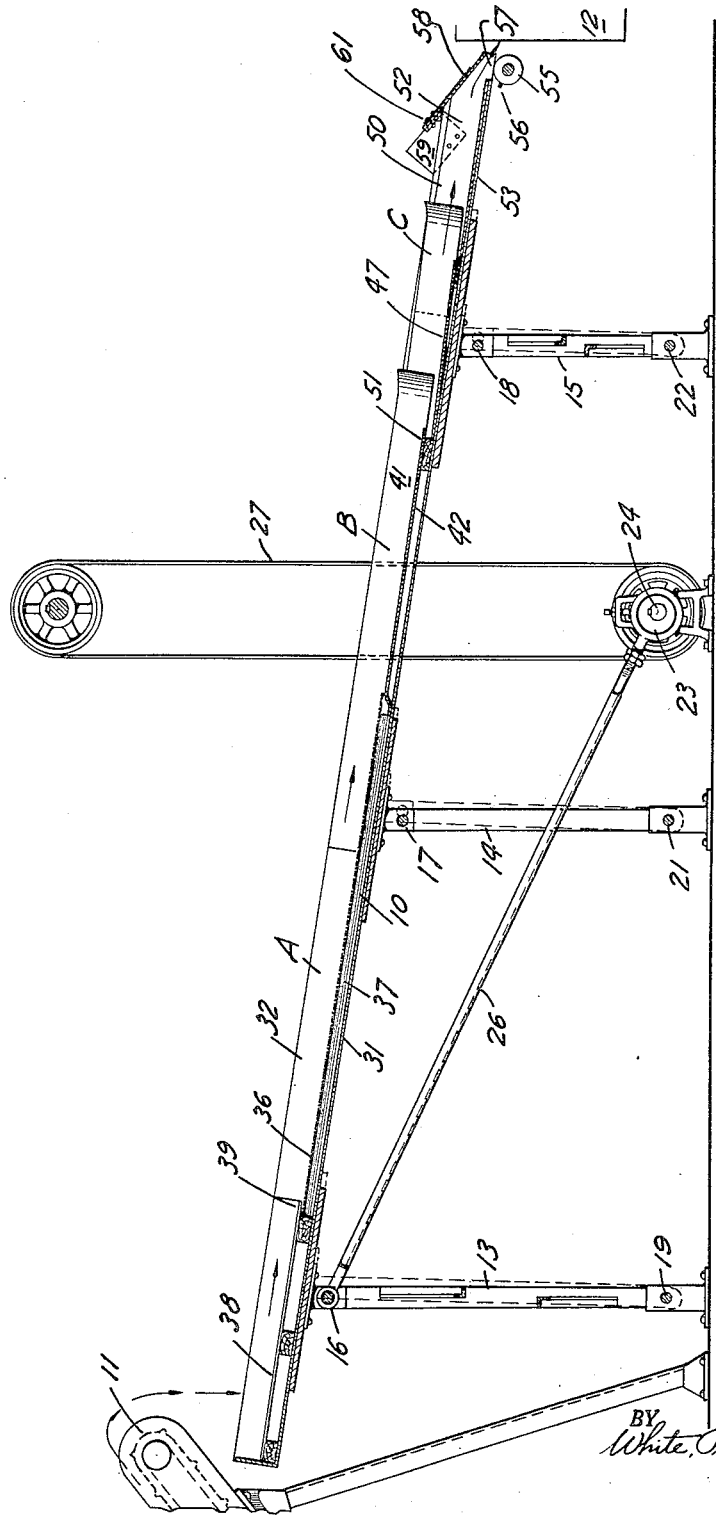
INVENTOR.
Fred J. Mullins
BY
White, Prost, Flehr & Lothrop
ATTORNEYS.

Patented Jan. 10, 1933

1,893,903

UNITED STATES PATENT OFFICE

FRED J. MULLINS, OF PIEDMONT, CALIFORNIA

FISH HANDLING DEVICE

Application filed January 31, 1930. Serial No. 424,877.

This invention relates generally to devices or apparatus for handling fish and is of particular value for use in automatically feeding fish to fish cutting machines.

In fish packing plants or canneries, it is frequently desirable to automatically deliver fish in a predetermined manner to certain machinery, or to some point of presentation. For example in sardine canneries it is desirable to provide means which will automatically feed the fish to eviscerators or equivalent machines. By fish eviscerators I have particular reference to machines for removing the heads and tails of the fish preparatory to canning, and which may also remove the offal.

It is a general object of the present invention to devise a machine which will automatically feed or deliver fish head first to a fish eviscerator or similar machine.

It is a further object of the present invention to devise apparatus of the above character which will be comparatively simple in construction, which will have a minimum of moving parts, and which will operate with a minimum of manual supervision.

Further objects of the present invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings:

Figure 1 is a plan view of my device, illustrating the construction of its various sections and its mode of operation.

Fig. 2 is a cross sectional view taken along the line 2—2 of Fig. 1.

Fig. 3 is a cross sectional view taken along the line 3—3 of Fig. 1.

Fig. 4 is a cross sectional detail taken along the line 4—4 of Fig. 1.

The invention can be outlined briefly as comprising a shaker structure which is inclined, and which extends from the point to which fish are delivered, to the point to which they are to be presented. This structure is so formed and operated that as the fish are delivered at the top of the shaker, the shaking movement automatically turns the fish headfirst. Thus referring to the drawing, the shaker structure is designated generally at 10, and is inclined as shown in Fig. 3. The fish to be handled are delivered to the upper portion of this structure, as by means of a suitable conveyor 11. The lower end of structure 10 is arranged to deliver fish to a machine 12, which can be a fish eviscerator or fish cutting machine.

Structure 10 is continuously vibrated and therefore it has been shown as carried by the upright structural members 13, 14 and 15. These members are provided with suitable pivotal connections 16, 17 and 18 respectively with structure 10, and are also provided with suitable pivotal connections 19, 21 and 22, to a convenient fixed support. An eccentric 23 has been shown carried by a rotatable shaft 24, and this eccentric is connected to pivotal connection 16 by means of rod 26. Shaft 24 can be driven by suitable means, such as a belt 27. When the device is in operation, shaft 24 is continuously rotated at a relatively high rate of speed, so that structure 10 is rapidly vibrated in a general direction longitudinally of the path of movement of fish passing downwardly along the same. The provision of means for vibrating the structure 10 causes the fish to turn headfirst in passing down the structure as will be presently explained.

The length of structure 10 is preferably divided into a plurality of sections, these sections being designated A, B and C. Section A operates to provide means for generally alining the fish with their heads directed downwardly, while sections B and C constitutes means for causing the fish to be delivered in single file. Before explaining the preferred manner of constructing sections A, B and C, it should be noted that structure 10 irrespective of the above mentioned sections can be provided with a bottom wall 31 and downwardly converging side walls 32, these walls being made of suitable material such as sheet metal.

A practical and desirable construction for section A consists in providing a metal screen 36, which extends between the side walls 32, immediately above the bottom wall 31. This screen is preferably held in spaced relationship with bottom wall 31, as by providing spaced corrugations 37 as shown in Fig. 2. Instead of discharging the fish from conveyor 11 directly upon screen 36, it has been found desirable to discharge them upon a surface, such as is afforded by a sheet metal wall 38. The lower edge portion 39 of wall 38 can overlap the upper edge portion of screen 36, so that as the fish are delivered to wall 38 they move without interruption upon the screen 36. As the fish pass downwardly over section A, due to the rapid continual vibration to the weight of the heads of the fish, they tend to arrange themselves with their heads foremost. The screen prevents the fish from being precipitated too rapidly over section A.

Section B is formed by a pair of converging side walls 41, in conjunction with a relatively smooth surfaced lower wall 42. The lower end portions 43 of walls 41, are sufficiently close together as to form a relatively restricted passageway 44. It will be noted that passageway 44 is narrower or more restricted at its upper portion than at its lower portion. In other words it diverges downwardly. The width of this passageway 44 is designed according to the size of the fish to be handled, but it is sufficiently narrow that fish must pass thru the same one by one. Lower wall 42 is also preferably spaced immediately above bottom wall 31, and its upper edge is overlapped by the lower edge of screen 36, as shown in Fig. 3.

Section C in its preferred form is formed by a pair of downwardly converging walls 46, in conjunction with a lower wall 47. The lower end portions 48 of walls 46 are likewise spaced apart a certain amount, similar to the ends 43 of walls 41, to form a restricted passageway 49. Passageway 49 is also of such width that the fish must pass thru the same in single file. The upper edge of wall 47 preferably underlies the lower edge 51 of wall 42, and this edge 51 is also preferably cut back from the lower end portions of walls 41. Passageway 49 is arranged to deliver the fish into a relatively narrow trough 50 formed by side walls 52, and lower wall 53.

In order to positively propel fish from the lower end of trough 50, I have shown a wheel 55 which is positively driven at a rate of speed dependent upon the rate of speed of certain operating elements of the machine 12. A pin 56 projects from wheel 55, and in its path of rotation, it travels thru a slot 57 in the lower end of trough 50. Normally the lower end of trough 50 is restricted in such a manner that fish cannot be discharged from the same, until propelled by being engaged by pin 56. This can be accomplished by providing a resilient strip 58, extending down between wall portion 52 at a suitable angle, as shown in Fig. 3. For mounting strip 58 I have shown a bracket 59 suitably carried by wall portion 52, and to which strip 58 is adjustably connected by means of a bolt 61. The wheel 55 and machine 12 are of themselves no part of the invention claimed herein, and are shown merely to illustrate the manner in which my invention can be utilized.

In operating my device, fish are discharged upon the upper end of structure 10, from the conveyor 11, these fish being generally of a comparatively uniform size. Usually a sufficient amount of water or brine solution is also discharged with the fish, and this solution aids in sluicing the fish down along the shaker structure, to the point of presentation. Due to the incline at which the structure is disposed, and also due to the vibratory movement, the fish move continuously down across the screen 36 of section A, thru sections B and C, and into trough 50. Assuming that a fish 62 is discharged upon the screen 36 in such a position that it extends lateral to its direction of movement, or with its tail directed downwardly, the rapid vibratory movement of the structure, together with the fact that the head of the fish is relatively heavy, causes the fish to be turned with its head directed downwardly. The fish are thus delivered from screen 36 with their heads foremost, and as they pass thru passageway 44, they are singled out in such a manner that as a general rule the fish are delivered successively. However section B of itself cannot entirely be relied upon to single out the fish, particularly if the fish delivered upon wall 41 are somewhat crowded. In this event the fish tend to pass thru passageway 44 in superposed relationship. Assuming for example that two fish are in superposed relationship as they enter passageway 44, the uppermost fish will be retarded because the upper portion of passageway 44 is narrower than the width of the fish which the device is to handle. The result is that the uppermost fish, in order to move thru passageway 44, must turn thru an angle of 40 degrees, and while this turning is taking place the lowermost fish is moving forwardly. In other words the overlap of two superposed fish is materially reduced by movement thru passageway 44. However the combined effect of section C with section B, secures more reliable singling out as section C further reduces any overlap. The fish are therefore always delivered to trough 50 in single file and with only a slight overlap if any. It is of course apparent that the rate with which fish are delivered to the shaker structure, should be determined by the capacity of the machine 12. Fish should be delivered to trough 50 at a rate sufficient that a fish will always be engaged and projected upon each revolution of pin 56. In case the rate with which fish are delivered by conveyor 11 becomes less than the capacity of machine 12 during any operating period, no particular harm will result, since pin 56 will occasionally fail to engage and project a fish into the machine. Likewise if for any period the rate with which fish are delivered upon the shaker structure bcomes greater than the capacity of machine 12, it will be found that the device will not become jammed, but will always deliver the fish in proper order thru the trough 50.

I claim:

1. In a device of the class described, a shaker structure having one portion thereof arranged to receive fish and another portion thereof arranged near a point to which fish are to be presented, said structure forming a path of movement for fish inclined downwardly towards the point of presentation and being divided into upper, intermediate and lower sections, the upper section constituting means for tending to cause the fish to move head first, the intermediate section constituting means for causing the fish to move along in single file and for reducing overlap between superposed fish, and the third section having converging side walls and constituting means for receiving fish in single file from the intermediate section and for further reducing the overlap between sucessive ones of the fish.

2. In a device of the class described, a shaker structure having one portion thereof arranged to receive fish and another portion thereof arranged near a point to which fish are to be presented, said structure forming a path for fish inclined downwardly towards the point of presentation and being divided into upper, intermediate and lower sections, the upper section constituting means tending to cause the fish to move head first, the intermediate section being formed by converging side walls arranged to provide a vertical opening for passage of the fish, the upper portion of said opening being more restricted than the lower portion, and the third section likewise formed of converging side walls to effect better distribution and delivery of the fish in single file.

3. In a device of the class described, a shaker structure having one portion thereof arranged to receive fish, and another portion thereof arranged near a point to which fish are to be presented, said structure forming a path for fish inclined downwardly towards the point of presentation, and being divided into upper, intermediate and lower sections, the upper section constituting means tending to cause the fish to move head first, said intermediate section including a lower wall over which the fish are adapted to move and upright side walls converging toward the point of presentation, the ends of said side walls adjacent the point of presentation being spaced apart to form an opening thru which fish are caused to pass, said opening being adapted to single out the fish and being narrower at its upper portion than at its lower portion, and a third section constituting means for receiving fish from the intermediate section and for delivering the fish in single file to the point of presentation.

4. In a device of the class described, a shaker structure having one portion thereof arranged to receive fish, and another portion thereof arranged near a point to which fish are to be presented, said structure forming a path for fish inclined downwardly towards the point of presentation, and being divided into upper, intermediate and lower sections, the upper section constituting means tending to cause the fish to move head first, said intermediate section including a lower wall over which the fish are adapted to move and upright side walls converging toward the point of presentation, the ends of said side walls adjacent the point of presentation being spaced apart to form a delivery opening through which fish are caused to pass, and a third section constituting means for receiving fish from the intermediate section and for delivering the fish in single file to the point of presentation, said third section being formed of side walls diverging toward and embracing said delivery opening of the intermediate section.

In testimony whereof, I have hereunto set my hand.

FRED J. MULLINS.